May 24, 1966  A. ARLAUSKAS ETAL  3,252,726
SCREW-AND-NUT MECHANISM
Filed Nov. 15, 1963  2 Sheets-Sheet 1
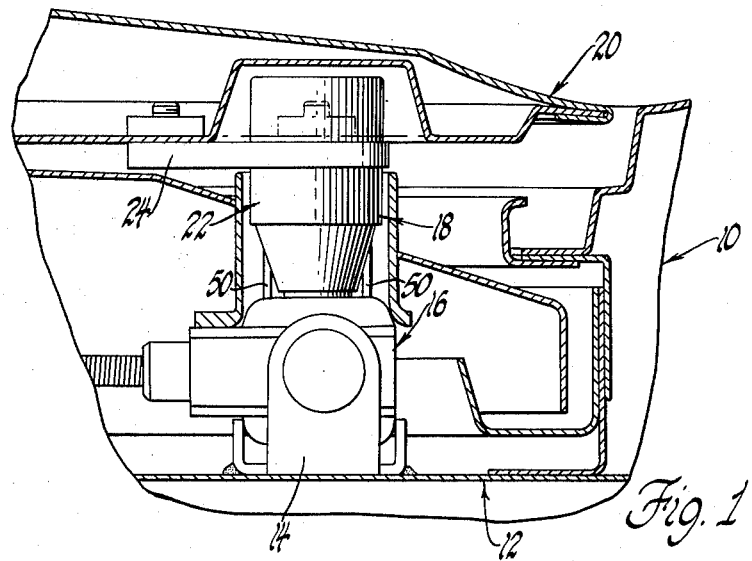
Fig. 1
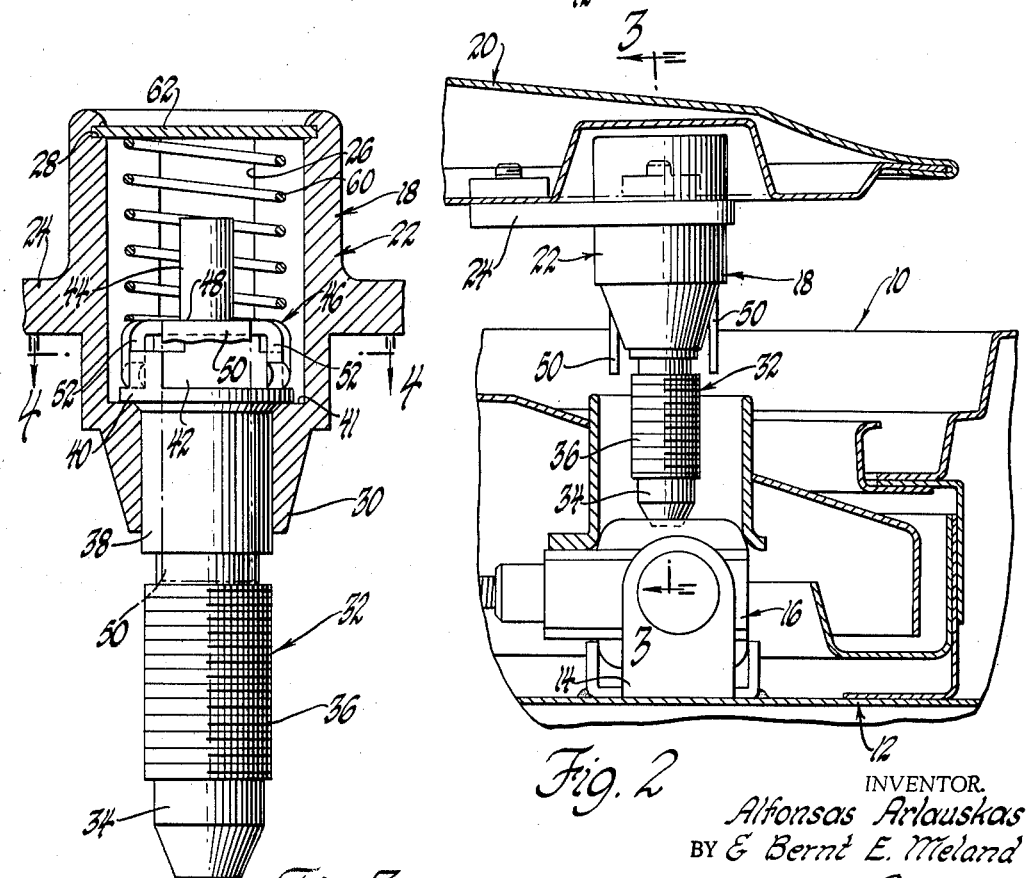
Fig. 3
Fig. 2
INVENTOR.
Alfonsas Arlauskas
BY & Bernt E. Meland
Herbert Furman
ATTORNEY May 24, 1966

A. ARLAUSKAS ETAL 3,252,726

SCREW-AND-NUT MECHANISM

Filed Nov. 15, 1963

INVENTOR.
Alfonsas Arlauskas
BY & Bernt E. Meland

Herbert Furman
ATTORNEY 3,252,726
SCREW-AND-NUT MECHANISM
Alfonsas Arlauskas, Livonia, and Bernt E. Meland, South-
field, Mich., assignors to General Motors Corporation,
Detroit, Mich., a corporation of Delaware
Filed Nov. 15, 1963, Ser. No. 324,126
6 Claims. (Cl. 292—251)

This invention relates to means for securing a pair of members to each other and more particularly to a screw-and-nut mechanism for releasably securing a pair of members to each other.

One feature of this invention is that the mechanism includes rotatable screw and nut elements engageable with each other for releasably securing a pair of members to each other. Another feature of this invention is that the screw element is normally held against rotation but is released to rotate with the nut element after it has been received a predetermined distance within the nut element. Yet another feature of this invention is that holding means normally hold the screw element against rotation and release the screw element to rotate with the nut element upon engagement of the holding means with the nut element. Yet another feature of this invention is that the screw element is slidably mounted on one member, that means are provided for slidably locating the screw element on the one member, and that means are provided to bias the screw element into engagement with the locating means and also bias the holding means into engagement with the screw element.

These and other features of the invention will be readily apparent from the following specification and drawings wherein:

FIGURE 1 is a sectional view of a portion of the vehicle body wherein a closure member is releasably secured to a body member by a screw-and-nut mechanism according to this invention;

FIGURE 2 is a view similar to FIGURE 1 showing the closure member released from the body member;

FIGURE 3 is an enlarged sectional view taken generally along the plane indicated by line 3—3 of FIGURE 2;

Figure 4:
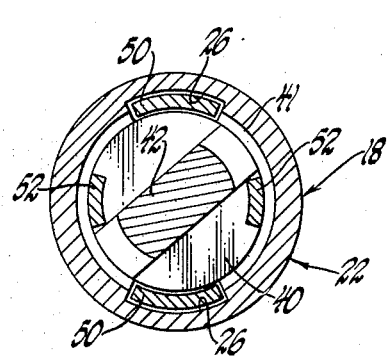
FIGURE 4 is a sectional view taken generally along the plane indicated by line 4—4 of FIGURE 3.

Referring now particularly to FIGURE 1 of the drawings, a vehicle body generally designated 10 includes a body member 12 mounting a support bracket 14 having spaced upwardly extending apertured ears. A nut or nut mechanism generally designated 16 is swingably mounted between the ears of the bracket 14. The details of the nut mechanism are neither shown nor described since the nut mechanism is the same as that shown in FIGURES 3 and 4 of Lohr et al. 2,905,012, issued September 22, 1959. For an understanding of this invention, all that is necessary is that it be understood that the nut mechanism 16 includes an internally threaded rotatable nut element for receiving an externally threaded screw element and being driven by some power operating means, such as an electric motor, through a flexible cable, or otherwise.

A screw mechanism 18 is mounted on a body closure member generally designated 20 which is suitably mounted on the body 10 for movement between a closed position, as shown in FIGURE 1, and an open position, as shown in FIGURE 2, with respect to the body member 12.

The screw mechanism 18 generally includes an annular housing 22 having a lateral apertured mounting flange 24 bolted to the closure member 20, as shown in FIGURES 1 and 2. The housing 22 includes a pair of axially extending internal grooves or keyways 26 which are located generally diametrically opposite of each other and which terminate at one end thereof at an internal annular shoulder 28 located inwardly of one end of the housing. The keyways extend through a bushing or bearing portion 30 of the housing to the other end thereof. The screw element 32 includes a nonthreaded pilot portion 34, a threaded portion 36, and a nonthreaded body portion 38. The portion 38 is received within the bearing portion 30 of the housing to rotatably mount the screw element within the housing, with an annular flange 40 of the screw element engaging the shoulder 41 of the bearing portion to axially located the screw element in the housing against movement in one direction outwardly thereof. An axially extending lug or rib 42 extends transversely of the flange 40 and a pilot or boss 44 extends axially of the rib 42.

A connecting member 46 includes an apertured base portion 48 which is slidably received on the pilot 44 of the screw element and seats on the rib 42. The member 46 includes a pair of long axially extending keys 50 which are slidably and nonrotatably received within the keyways 26 of the housing 22 and which project outwardly of portion 30 thereof. The member 46 further includes a pair of short axially extending keys or ribs 52 which are located intermediate the keys 50 and are provided with generally tapered or contoured lower edges 54 and oppositely disposed shorter and longer side edges 56 and 58. The edges 56 of the keys 52 engage opposite sides of the rib 42 of the screw element, as shown in FIGURES 3 and 4, to hold the screw element against clockwise rotation with respect to the housing 22. A coil compression spring 60 seats between the base portion 48 of member 46 and a staked closure 62 of the housing 22 to normally hold the flange 40 of the screw element in engagement with the shoulder 41 of the housing and to hold the base portion 48 of member 46 in engagement with the upper surface of the rib 42 to locate the keys 50 and 52 respectively relative to the screw element 32 and rib 42.

When the closure member 20 is moved toward closed position with respect to the body member 12, the pilot portion 34 of the screw element will initially enter the rotating nut element of the nut mechanism 16 and then the threaded portion 36 of the screw element will engage the internal threads of the nut element to thereby start to thread the screw element into the nut element and move the closure member 20 toward the body member 12 when the screw element 32 has moved a predetermined distance within the nut element and the closure member 20 has been moved to the desired closed position with respect to the member 12, the free ends of the keys 50 will engage the nut mechanism 16 to thereby shift the member 46 upwardly or axially of the screw element 32 and against the action of spring 50 to thereby move the edges 56 of keys 52 out of engagement with the rib 42 so that the relieved portions 64 of rib 42 will engage edges 54 of keys 52 and ratchet past the keys as the screw element 32 rotates with the nut element. It will be understood that the length of the keys 50 is adjusted so that the keys 50 will not engage the nut mechanism 16 until the screw element 32 has been threaded a sufficient distance into the nut element to move the closure 20 to the desired closed position.

Figure 5:
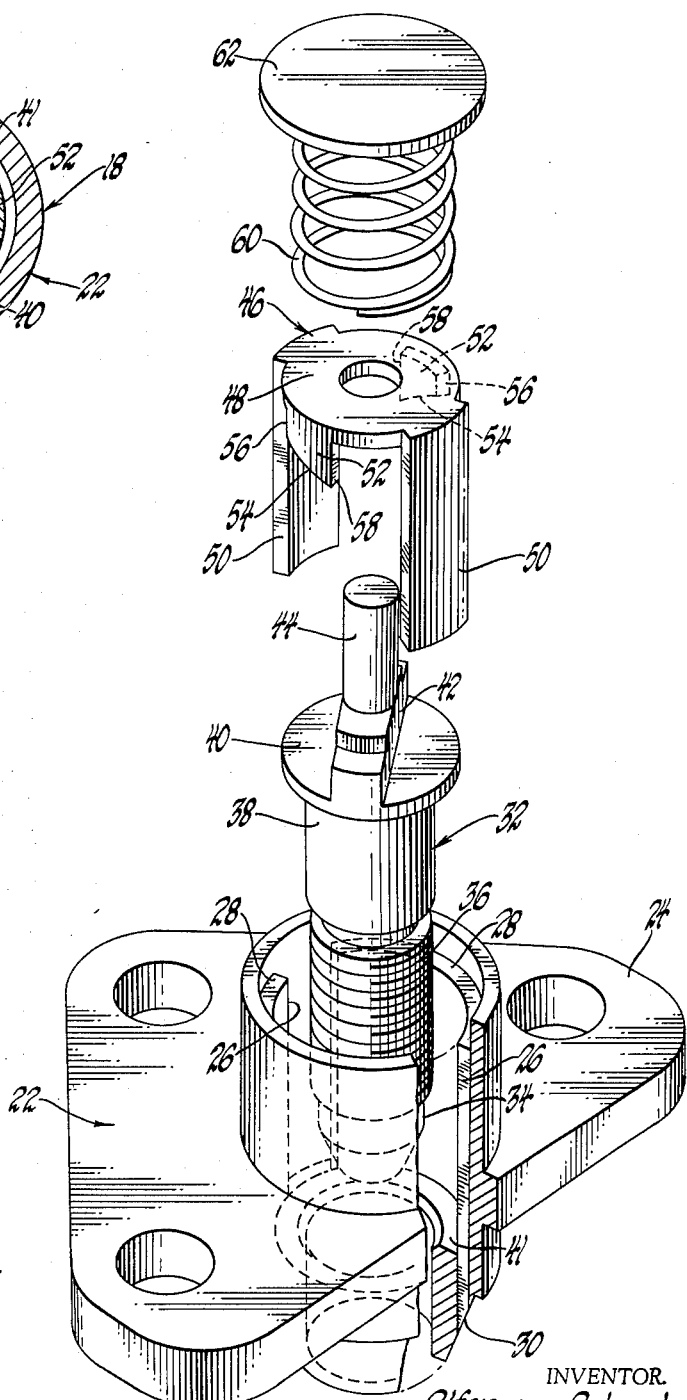
FIGURE 5 is an exploded perspective view.

When the direction of rotation of the nut element is reversed, the screw element 32 will rotate with the nut element until the rib 42 engages the edges 58 of the keys 52 whereupon the screw element 32 will be held against counterclockwise rotation with respect to the housing 22 as viewed in FIGURES 3 and 5 so that continued rotation of the nut element will thread or move the screw element axially outwardly of the nut element to thereby move the closure member 20 away from the body member 12 to its open position as shown in FIGURE 2.

Normally the rib 42 will engage the edges 58 of the keys 52 until rotated through a sufficient number of degrees so that it will engage the edges 56. Normally this rotation will occur upon initial engagement of the threaded portion 36 of the screw element with the nut element, although for the purposes of description hereinbefore, it was assumed that the rib 42 was in engagement with the edges 56 of the keys 52.

The pivotal mounting of the nut mechanism 16 on the body member permits some angular misalignment between the threaded element 32 and the nut mechanism 16 and further permits the use of swingable closure members.

Thus, this invention provides an improved screw-and-nut mechanism.

We claim:

1. Means for securing a pair of members to each other comprising, in combination, a screw element rotatably mounted on one of said members, means interconnecting said screw element and said one member and normally releasably holding said screw element against rotation, a nut element rotatably mounted on the other of said members for receiving said screw element, operating means for rotating said nut element, and means on the other of said members operative upon receipt of said screw element within said nut element to release said screw element from said interconnecting means and permit rotation of said screw element with said nut element.

2. Means for securing a pair of members to each other comprising, in combination, a screw element, means rotatably mounting said screw element on one of said members, key means mounted on said one member for movement axially of said screw element and including means engageable with said screw element for normally releasably holding said screw element against rotation, a nut element rotatably mounted on the other of said members for receiving said screw element, and means on said other of said members for moving said key means axially of said screw element and out of engagement therewith to permit rotation of said screw element with said nut element.

3. Means for securing a pair of members to each other comprising, in combination, a screw element rotatably mounted on one of said members, a connecting member slidably and nonrotatably mounted on said one of said members, cooperating means on said connecting member and said screw element for normally holding said screw element against rotation, a nut element rotatably mounted on the other of said members for receiving said screw element, and means operative upon receipt of said screw element within said nut element for sliding said connecting member relative to said one member and out of engagement with said screw element to release said screw element against rotation.

4. Means for securing a pair of members to each other comprising, in combination, a screw element, means rotatably mounting said screw element on one of said members, key means mounted on said one member for movement axially of said screw element and including means engageable with said screw element for normally releasably holding said screw element against rotation, means biasing said key means into engagement with said screw element, a nut element rotatably mounted on the other of said members for receiving said screw element, and means on said other of said members for moving said key means axially of said screw element and out of engagement therewith against the action of said biasing means to permit rotation of said screw element with said nut element.

5. Means for securing a pair of members to each other comprising, in combination, a screw element, means mounting said screw element on one of said members for rotational movement and axial movement relative thereto, means axially locating said screw element, a connecting member slidably and nonrotatably mounted on said one of said members, means on said connecting member engageable with means on said screw element to hold said screw element against rotation, means biasing said connecting member into engagement with said screw element, a nut element rotatably mounted on the other of said members for receiving said screw element, and means for moving said connecting member out of engagement with said screw element and against the action of said biasing means upon receipt of said screw element within said nut element to permit rotation of said screw element with said nut element.

6. Means for securing a pair of members to each other comprising, in combination, a screw element slidably and rotatably mounted on one of said members, connecting means slidably and nonrotatably mounted on said one member and engageable with said screw element to releasably hold said screw element against rotation, a nut element mounted on the other of said members for rotatably engaging said screw element, and means on said other of said members for slidably moving said connecting means and said screw element relative to each other to release said screw element against rotation and permit rotation of said screw element with said nut element.

References Cited by the Examiner
UNITED STATES PATENTS

| Re. 24,375 | 10/1957 | Thompson | 292—251 |
| 2,722,725 | 11/1955 | Moore. | |
| 2,753,202 | 7/1956 | Smith et al. | 292—251 |
| 3,122,012 | 2/1964 | Christopher | 292—251 X |

JOSEPH D. SEERS, Primary Examiner.

R. E. MOORE, Assistant Examiner.